United States Patent
Wang et al.

(10) Patent No.: US 12,513,652 B2
(45) Date of Patent: *Dec. 30, 2025

(54) METHOD, APPARATUS AND COMPUTER PROGRAM PRODUCT

(71) Applicant: NOKIA SOLUTIONS AND NETWORKS OY, Espoo (FI)

(72) Inventors: Jun Wang, Shanghai (CN); Gang Shen, Shanghai (CN); Liuhai Li, Shanghai (CN); Liang Chen, Shanghai (CN); Kan Lin, Shanghai (CN); Zhihua Wu, Nanchang (CN); Chaojun Xu, Shanghai (CN); Jiexing Gao, Shanghai (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/625,909

(22) Filed: Apr. 3, 2024

(65) Prior Publication Data

US 2024/0276432 A1 Aug. 15, 2024

Related U.S. Application Data

(63) Continuation of application No. 17/275,888, filed as application No. PCT/CN2018/106055 on Sep. 17, 2018, now Pat. No. 12,041,571.

(51) Int. Cl.
*H04W 64/00* (2009.01)

(52) U.S. Cl.
CPC ......... *H04W 64/00* (2013.01); *G01S 2205/02* (2020.05)

(58) Field of Classification Search
CPC ...................................................... H04W 64/00
(Continued)

(56) References Cited

U.S. PATENT DOCUMENTS

| 7,406,320 B1 | 7/2008 | Kumar |
| 7,734,298 B2 * | 6/2010 | Bhattacharya .......... G01S 5/021 455/456.1 |

(Continued)

FOREIGN PATENT DOCUMENTS

| CN | 101489181 A | 7/2009 |
| CN | 104185270 A | 12/2014 |

(Continued)

OTHER PUBLICATIONS

Chinese Office Action corresponding to CN 201880098875.6, dated Jan. 19, 2024.

(Continued)

*Primary Examiner* — Joseph Arevalo
(74) *Attorney, Agent, or Firm* — SQUIRE PATTON BOGGS (US) LLP

(57) ABSTRACT

There is provided a method comprising receiving at least one measured signal characteristic from a user equipment, the user equipment being located at a user equipment location; comparing the at least one measured signal characteristic to at least one of a plurality of signal characteristics, each signal characteristic being associated with a respective measurement point; and determining, based on the comparing, a probability that the user equipment location is a first location.

16 Claims, 17 Drawing Sheets

(58) Field of Classification Search
USPC ............ 455/456.1, 450, 456.3, 456.5, 67.11, 455/456.2, 404.2, 423, 509, 446
See application file for complete search history.

(56) References Cited

U.S. PATENT DOCUMENTS

| | | | |
|---|---|---|---|
| 8,996,302 B2 | 3/2015 | Marti | |
| 2004/0198386 A1* | 10/2004 | Dupray | G01S 5/02 455/456.1 |
| 2004/0266457 A1* | 12/2004 | Dupray | H04W 64/00 455/456.1 |
| 2007/0287473 A1* | 12/2007 | Dupray | H04W 4/029 455/456.1 |
| 2009/0312037 A1* | 12/2009 | Jo | G01S 5/08 455/456.2 |
| 2012/0058775 A1* | 3/2012 | Dupray | G01S 5/0258 455/456.1 |
| 2012/0289249 A1* | 11/2012 | Bhattacharya | G01S 19/06 455/456.1 |
| 2013/0035110 A1 | 2/2013 | Sridhara et al. | |
| 2014/0243015 A1 | 8/2014 | Basha | |
| 2014/0355592 A1 | 12/2014 | Camps | |
| 2015/0133166 A1 | 5/2015 | Edge | |
| 2015/0172872 A1 | 6/2015 | Alsehly | |
| 2015/0373503 A1 | 12/2015 | Jovicic | |
| 2016/0356875 A1 | 12/2016 | Wolf et al. | |
| 2018/0035263 A1 | 2/2018 | Titus et al. | |
| 2020/0096598 A1 | 3/2020 | Jadav | |
| 2020/0162890 A1 | 5/2020 | Spencer | |
| 2020/0300972 A1 | 9/2020 | Wang | |

FOREIGN PATENT DOCUMENTS

| | | |
|---|---|---|
| CN | 108521627 A | 9/2018 |
| EP | 2158498 A1 | 3/2010 |
| KR | 101680481 B1 | 11/2016 |
| WO | 2014/006423 A2 | 1/2014 |
| WO | 2016/066988 A2 | 5/2016 |

OTHER PUBLICATIONS

First Office Action dated Jun. 25, 2023 corresponding to Chinese Patent Application No. 201880098875.6, with English summary.
Shan-he Liao et al., "Outdoor positioning technology based on telecom data, "Computer Engineering & Science, CN 43-1258/TP, vol. 4, No. 4, Apr. 15, 2018.
Li Li et al., "HIWL: An Unsupervised Learning Algorithm for Indoor Wireless Localization," 2013 12th IEEE International Conference on Trust, Security and Privacy in Computing and Communications, IEEE, Sep. 12, 2013.
Jochen Seitz et al., "A Hidden Markov Model for Urban Navigation Based on Fingerprinting and Pedestrian Dead Reckoning," 2010 13th International Conference on Information Fusion, Feb. 10, 2011.
"InLocation Alliance (ILA) documents", Openmobilealliance, Retrieved on Apr. 15, 2021, Webpage available at: https://www.openmobilealliance.org/wp/Affiliates/ILA.html.
Kjærgaard, "A Taxonomy for Radio Location Fingerprinting", International Symposium on Location- and Context- Awareness, LNCS vol. 4718, 2007, pp. 139-156.
Yin et al., "Learning Adaptive Temporal Radio Maps for Signal-Strenth-Based Location Estimation", IEEE Transactions on Mobile Computing, vol. 7, No. 7, Jul. 2008, pp. 869-883.
Zucchini et al., "Hidden Markov Models for Time Series—An Introduction Using R", Chapman and Hall/CRC, 1st edition, 2009, 278 pages.
Blunsom, "Hidden Markov Models", Lecture notes, Aug. 2004, 7 pages.
Sesena-Osorio et al., "Indoor Propagation Modeling for Radiating Cable Systems in the Frequency Range of 900-2500MHz", Progress In Electromagnetics Research B, vol. 47, 2013, pp. 241-262.
Weber et al., "Wireless Indoor Positioning: Localization improvements with a Leaky Coaxial Cable Prototype", International Conference on Indoor Positioning and Indoor Navigation (IPIN), Sep. 21-23, 2011, 3 pages.
Engelbrecht et al., "Advantage of Non-Periodic Leaky Coaxial Cable Structures for Indoor Positioning", IEEE Vehicular Technology Conference (VTC Fall), Sep. 5-8, 2011, 5 pages.
Nishikawa et al., "A New Position Detection Method using Leaky Coaxial Cable", IEICE Electronics Express, vol. 5, Jan. 2008, 4 pages.
International Search Report and Written Opinion corresponding Patent Cooperation Treaty Application No. PCT/CN2018/106055, dated Jun. 17, 2019, 9 pages.
Extended European Search Report received for corresponding European Patent Application No. 18933839.5, dated Mar. 30, 2022, 8 pages.
He et al., "Wi-Fi Fingerprint-Based Indoor Positioning: Recent Advances and Comparisons", IEEE Communications Surveys & Tutorials, vol. 18, No. 1, Firstquarter 2016, pp. 466-490.
Chinese Office Action with English machine translation, corresponding to CN Application No. 201880098875.6, dated May 24, 2024.
Communication pursuant to Article 94(3) EPC dated Oct. 1, 2024, corresponding to European Patent Application No. 18 933 839.5.

* cited by examiner

METHOD, APPARATUS AND COMPUTER PROGRAM PRODUCT

CROSS REFERENCE TO RELATED APPLICATION

This application is a Continuation of co-pending U.S. patent application Ser. No. 17/275,888, filed on Mar. 12, 2021, which is the National Stage of PCT International Application No. PCT/CN2018/106055, filed on Sep. 17, 2018. The entire content of the above-referenced applications is hereby incorporated by reference.

TECHNICAL FIELD

Some embodiments relate to a method, apparatus, and system for tracking a position of a user equipment.

BACKGROUND

Accurate indoor positioning may unlock a new set of possibilities for mobile services. Consumers may benefit from personalized, contextual information and offers, as well as new services such as indoor navigation. It may also create new marketing opportunities, which may mean that proper services and information can be delivered according to user's current location or future location.

Emerging indoor location based services may include social networking, people finders, marketing campaigns, asset tracking, etc. Furthermore, accurate localization may also assist firefighters, police, soldiers, medical personnel etc. in performing specific tasks and locating people.

There are multiple difficulties when it comes to achieving high precision indoor localization. Standard approaches including Global Positioning System (GPS) that are used for outdoor localization cannot be easily used due to unreliability and obstacles that are present in indoor environments.

SUMMARY

According to an aspect, there is provided a method comprising: receiving at least one measured signal characteristic from a user equipment, the user equipment being located at a user equipment location; comparing the at least one measured signal characteristic to at least one of a plurality of signal characteristics, each signal characteristic being associated with a respective measurement point; and determining, based on the comparing, a probability that the user equipment location is a first location.

The user equipment location may comprise a location of a user equipment within a venue.

The method may comprise conceptually partitioning the venue into a plurality of sections.

Each of the plurality of sections may comprise one or more measurement points.

The method may comprise storing the plurality of signal characteristics and the respective measurement point associated with a respective signal characteristic in a database.

A distribution of measurement points may be dependent on a layout of the venue.

The at least one signal characteristic may be filtered.

The method may comprise receiving a sequence of signal characteristic measurements, the sequence of signal characteristic measurements comprising at least a first measurement at a first timestamp and a second measurement at a second timestamp.

The method may comprise inputting the sequence of signal characteristic measurements into a Hidden Markov Model.

The Hidden Markov Model may be configured to determine at least one of: a location of the user equipment; and a route taken by the user equipment.

The determined location of the user equipment may comprise one of the plurality of sections.

The determined location of the user equipment and/or the determined route taken by the user equipment at a first time may be based on a determined location and/or route at a time earlier than the first time.

The Hidden Markov Model may comprise at least one of: a transition probability matrix; an emission probability matrix; and an initial state probability matrix.

The transition probability matrix may comprise, for each one of the plurality of sections, a respective transition probability of the user equipment accessing each of the other ones of the plurality of sections during a time interval between the first timestamp and the second timestamp.

The transition probability from a first section to a second section may be calculated as: (an area of the second section that a user equipment may access during the time interval between the first timestamp and the second timestamp)/(a total area that the user equipment may access during the time interval between the first timestamp and the second timestamp).

The transition probability may be dependent on a speed and/or orientation of the user equipment.

The transition probability may be dependent on a previously determined location of the user equipment.

The emission probability matrix may comprise, for each one of the plurality of sections, a probability of the measured signal characteristic originating from a respective one of the plurality of sections.

The emission probability for a first section may be calculated as: (a number of signal characteristic measurements having a first value originating from the first section)/(the number of signal characteristic measurements from the first section).

The initial state probability matrix may comprise, for each one of the plurality of sections, a probability that the respective one of the plurality of connected areas is an area of the first signal characteristic measurement in the signal characteristic measurement sequence.

The method may comprise outputting at least one of: the determined location of the user equipment; and the determined route taken by the user equipment.

The determined location of the user equipment may comprise one of the plurality of connected areas.

The signal characteristic comprises an MR/XDR measurement.

According to an aspect, there is provided an apparatus comprising means for: receiving at least one measured signal characteristic from a user equipment, the user equipment being located at a user equipment location; comparing the at least one measured signal characteristic to at least one of a plurality of signal characteristics, each signal characteristic being associated with a respective measurement point; and determining, based on the comparing, a probability that the user equipment location is a first location.

The user equipment location may comprise a location of a user equipment within a venue.

The apparatus may comprise means for conceptually partitioning the venue into a plurality of sections.

Each of the plurality of sections may comprise one or more measurement points.

The apparatus may comprise means for storing the plurality of signal characteristics and the respective measurement point associated with a respective signal characteristic in a database.

A distribution of measurement points may be dependent on a layout of the venue.

The apparatus may comprise means for filtering the at least one signal characteristic.

The apparatus may comprise means for receiving a sequence of signal characteristic measurements, the sequence of signal characteristic measurements comprising at least a first measurement at a first timestamp and a second measurement at a second timestamp.

The apparatus may comprise means for inputting the sequence of signal characteristic measurements into a Hidden Markov Model.

The Hidden Markov Model may be configured to determine at least one of: a location of the user equipment; and a route taken by the user equipment.

The determined location of the user equipment may comprise one of the plurality of sections.

The determined location of the user equipment and/or the determined route taken by the user equipment at a first time may be based on a determined location and/or route at a time earlier than the first time.

The Hidden Markov Model may comprise at least one of: a transition probability matrix; an emission probability matrix; and an initial state probability matrix.

The transition probability matrix may comprise, for each one of the plurality of sections, a respective transition probability of the user equipment accessing each of the other ones of the plurality of sections during a time interval between the first timestamp and the second timestamp.

The transition probability from a first section to a second section may be calculated as: (an area of the second section that a user equipment may access during the time interval between the first timestamp and the second timestamp)/(a total area that the user equipment may access during the time interval between the first timestamp and the second timestamp).

The transition probability may be dependent on a speed and/or orientation of the user equipment.

The transition probability may be dependent on a previously determined location of the user equipment.

The emission probability matrix may comprise, for each one of the plurality of sections, a probability of the measured signal characteristic originating from a respective one of the plurality of sections.

The emission probability for a first section may be calculated as: (a number of signal characteristic measurements having a first value originating from the first section)/(the number of signal characteristic measurements from the first section).

The initial state probability matrix may comprise, for each one of the plurality of sections, a probability that the respective one of the plurality of connected areas is an area of the first signal characteristic measurement in the signal characteristic measurement sequence.

The apparatus may comprise means for outputting at least one of: the determined location of the user equipment; and the determined route taken by the user equipment.

The determined location of the user equipment may comprise one of the plurality of connected areas.

The signal characteristic comprises an MR/XDR measurement.

According to an aspect, there is provided an apparatus comprising at least one processor and at least one memory, the at least one processor configured to cause the apparatus to: receive at least one measured signal characteristic from a user equipment, the user equipment being located at a user equipment location; compare the at least one measured signal characteristic to at least one of a plurality of signal characteristics, each signal characteristic being associated with a respective measurement point; and determine, based on the comparing, a probability that the user equipment location is a first location.

The user equipment location may comprise a location of a user equipment within a venue.

The at least one processor may be configured to cause the apparatus to conceptually partition the venue into a plurality of sections.

Each of the plurality of sections may comprise one or more measurement points.

The at least one processor may be configured to cause the apparatus to store the plurality of signal characteristics and the respective measurement point associated with a respective signal characteristic in a database.

A distribution of measurement points may be dependent on a layout of the venue.

The at least one signal characteristic may be filtered.

The at least one processor may be configured to cause the apparatus to receive a sequence of signal characteristic measurements, the sequence of signal characteristic measurements comprising at least a first measurement at a first timestamp and a second measurement at a second timestamp.

The at least one processor may be configured to cause the apparatus to input the sequence of signal characteristic measurements into a Hidden Markov Model.

The Hidden Markov Model may be configured to determine at least one of: a location of the user equipment; and a route taken by the user equipment.

The determined location of the user equipment may comprise one of the plurality of sections.

The determined location of the user equipment and/or the determined route taken by the user equipment at a first time may be based on a determined location and/or route at a time earlier than the first time.

The Hidden Markov Model may comprise at least one of: a transition probability matrix; an emission probability matrix; and an initial state probability matrix.

The transition probability matrix may comprise, for each one of the plurality of sections, a respective transition probability of the user equipment accessing each of the other ones of the plurality of sections during a time interval between the first timestamp and the second timestamp.

The transition probability from a first section to a second section may be calculated as: (an area of the second section that a user equipment may access during the time interval between the first timestamp and the second timestamp)/(a total area that the user equipment may access during the time interval between the first timestamp and the second timestamp).

The transition probability may be dependent on a speed and/or orientation of the user equipment.

The transition probability may be dependent on a previously determined location of the user equipment.

The emission probability matrix may comprise, for each one of the plurality of sections, a probability of the measured signal characteristic originating from a respective one of the plurality of sections.

The emission probability for a first section may be calculated as: (a number of signal characteristic measurements having a first value originating from the first section)/(the number of signal characteristic measurements from the first section).

The initial state probability matrix may comprise, for each one of the plurality of sections, a probability that the respective one of the plurality of connected areas is an area of the first signal characteristic measurement in the signal characteristic measurement sequence.

The at least one processor may be configured to cause the apparatus to output at least one of: the determined location of the user equipment; and the determined route taken by the user equipment.

The determined location of the user equipment may comprise one of the plurality of connected areas.

The signal characteristic comprises an MR/XDR measurement.

According to an aspect there is provided a non-transitory computer readable storage medium comprising computer readable instructions which, when performed by at least one processor, cause the apparatus to: receive at least one measured signal characteristic from a user equipment, the user equipment being located at a user equipment location; compare the at least one measured signal characteristic to at least one of a plurality of signal characteristics, each signal characteristic being associated with a respective measurement point; and determine, based on the comparing, a probability that the user equipment location is a first location.

The user equipment location may comprise a location of a user equipment within a venue.

The computer readable instructions, when performed by the at least one processor, may cause the apparatus to conceptually partition the venue into a plurality of sections. Each of the plurality of sections may comprise one or more measurement points.

The computer readable instructions, when performed by the at least one processor, may cause the apparatus to store the plurality of signal characteristics and the respective measurement point associated with a respective signal characteristic in a database.

A distribution of measurement points may be dependent on a layout of the venue.

The at least one signal characteristic may be filtered.

The computer readable instructions, when performed by the at least one processor, may cause the apparatus to receive a sequence of signal characteristic measurements, the sequence of signal characteristic measurements comprising at least a first measurement at a first timestamp and a second measurement at a second timestamp.

The computer readable instructions, when performed by the at least one processor, may cause the apparatus to input the sequence of signal characteristic measurements into a Hidden Markov Model.

The Hidden Markov Model may be configured to determine at least one of: a location of the user equipment; and a route taken by the user equipment.

The determined location of the user equipment may comprise one of the plurality of sections.

The determined location of the user equipment and/or the determined route taken by the user equipment at a first time may be based on a determined location and/or route at a time earlier than the first time.

The Hidden Markov Model may comprise at least one of: a transition probability matrix; an emission probability matrix; and an initial state probability matrix.

The transition probability matrix may comprise, for each one of the plurality of sections, a respective transition probability of the user equipment accessing each of the other ones of the plurality of sections during a time interval between the first timestamp and the second timestamp.

The transition probability from a first section to a second section may be calculated as: (an area of the second section that a user equipment may access during the time interval between the first timestamp and the second timestamp)/(a total area that the user equipment may access during the time interval between the first timestamp and the second timestamp).

The transition probability may be dependent on a speed and/or orientation of the user equipment.

The transition probability may be dependent on a previously determined location of the user equipment.

The emission probability matrix may comprise, for each one of the plurality of sections, a probability of the measured signal characteristic originating from a respective one of the plurality of sections.

The emission probability for a first section may be calculated as: (a number of signal characteristic measurements having a first value originating from the first section)/(the number of signal characteristic measurements from the first section).

The initial state probability matrix may comprise, for each one of the plurality of sections, a probability that the respective one of the plurality of connected areas is an area of the first signal characteristic measurement in the signal characteristic measurement sequence.

The computer readable instructions, when performed by the at least one processor, may cause the apparatus to output at least one of: the determined location of the user equipment; and the determined route taken by the user equipment.

The determined location of the user equipment may comprise one of the plurality of connected areas.

The signal characteristic comprises an MR/XDR measurement.

According to an aspect there is provided a computer program product configured to perform any of the above-mentioned method.

DETAILED DESCRIPTION

Cellular operators may use periodic/event-triggered measurement report (MR) or call/transaction detail report (CDR and TDR respectively—jointly referred to as XDR) information reported from a user equipment (UE) to locate the UE.

A MR may include a list of one or several reference signal receiver power (RSRP) values from serving cell or neighbouring cells, and XDR just includes the serving cell RSRP value. A base station may calculate the distance to the UE from the RSRP strength and then use a trilateration algorithm to estimate the UE position. Alternatively, the RSRP values could be compared with a database comprising known values at known locations, also termed fingerprint values, to get the location.

However, for indoor scenarios covered by remote radio head (RRH) and leaky cables, these methods may not work.

Figure 1:
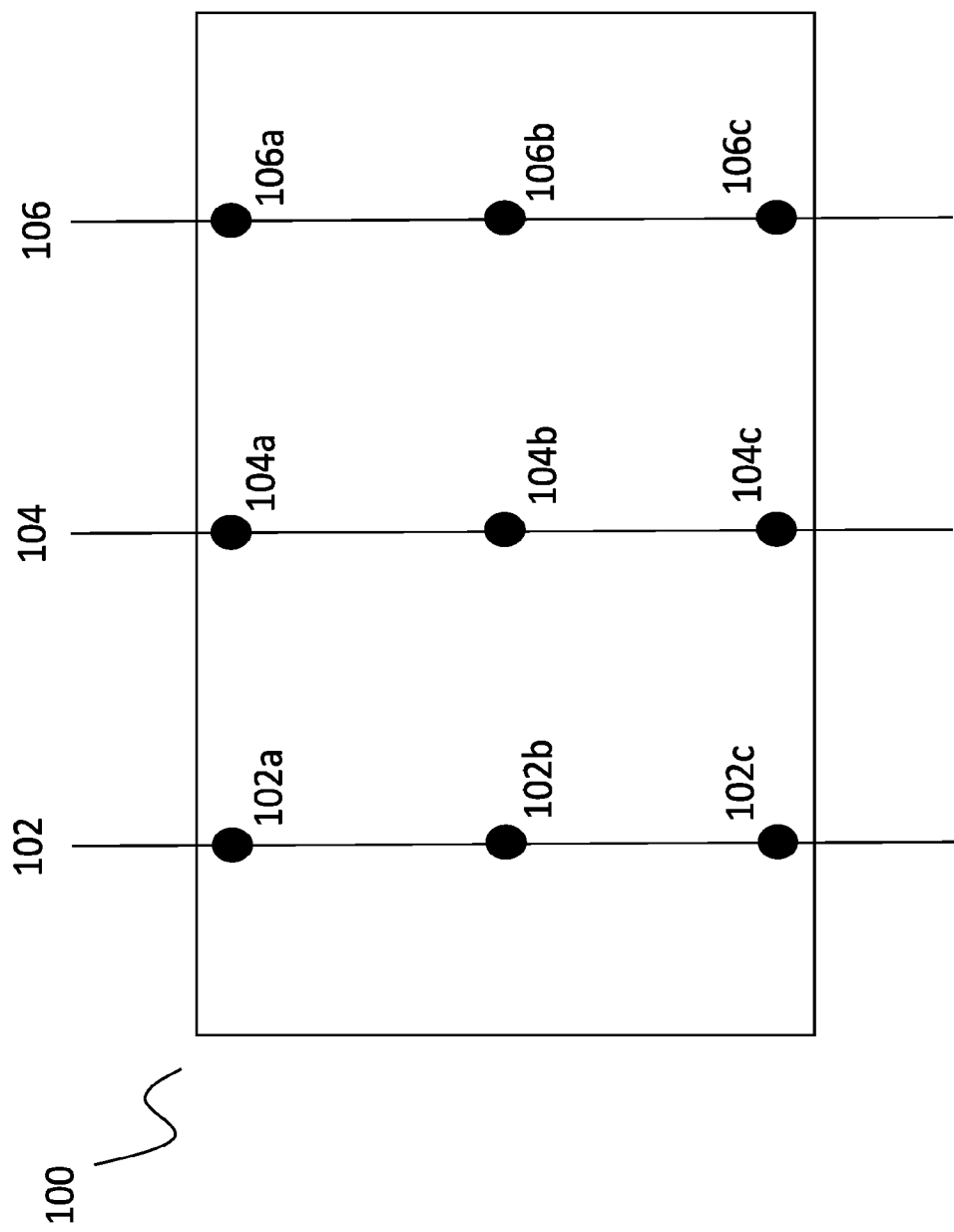
FIG. 1 shows a simplified leaky cable deployment in a venue.

For example, FIG. 1 shows a simplified leaky cable deployment of a venue. The venue may, for example, be a conference venue.

In FIG. 1, the venue 100 is covered by three different leaky cables 102, 104, 106. The cables carry a signal operating at different frequencies. For example, cable 102 may carry signal A operating at frequency 1, cable 104 may carry signal B operating at frequency 2, and cable 106 may carry signal C operating at frequency 3. Each cable has three gaps 102a-c, 104a-c, 106a-c.

As the signals passes along the cable, it escapes from the gaps. Thus the gaps act as transmitters for the signal being carried. The signal emitted from each of the gaps on the same cable is the same. For example, if signal A is passed through cable 102, then the signal emitted at points 102a, 102b and 102c will be the same signal, i.e. signal A.

The RSRP may be measured. When the RSRP for a particular signal is very strong, it may be determined that the UE is positioned close to one of the gaps. For example, if the RSRP for signal A is very strong, then it may be inferred that the UE is located close to one of the gaps 102a-c.

However the base station may be unable to distinguish which of the gaps 102a-c the received signal comes from. Thus it may be difficult for the base station to accurately calculate the distance or perform a comparison to fingerprint values.

This problem may be similar for AOA localization.

To solve this problem, some embodiments may utilise a method of indoor localization and tracking based on UE MR or XDR (MR/XDR) information, which considers the data uncertainty and sequence relativity.

Figure 8:
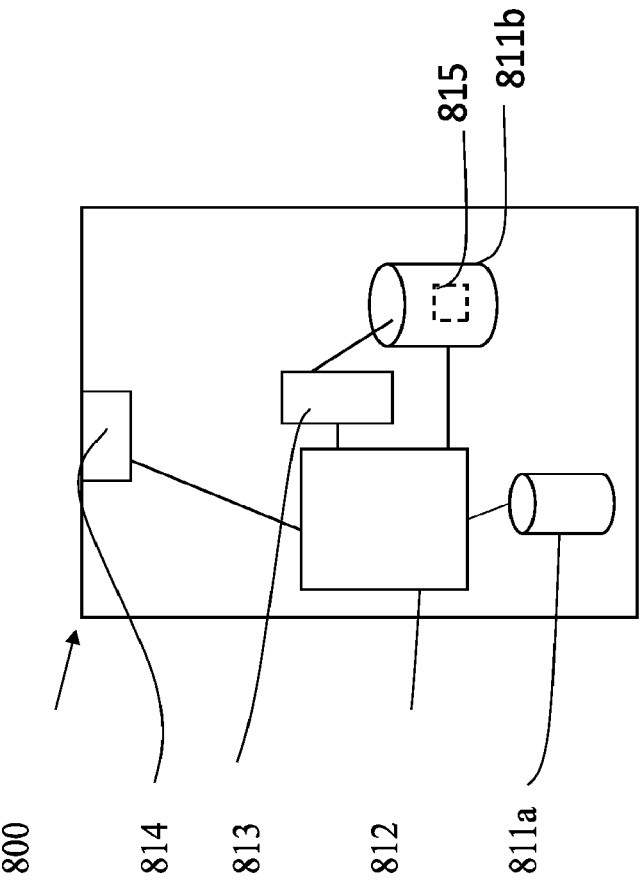
FIG. 8 shows an apparatus according to some embodiments.

FIG. 8 illustrates an example of a control apparatus 800 according to some embodiments. The control apparatus 800 may comprise at least one random access memory (RAM) 811a and at least on read only memory (ROM) 811b, at least one processor 812, 813 and an input/output interface 814. The at least one processor 812, 813 may be coupled to the RAM 811a and the ROM 811b. Via the interface the control apparatus 800 can be coupled to relevant other components of the base station. The at least one processor 812, 813 may be configured to execute an appropriate software code 815 to perform one or more of the steps of the method described below. The software code 815 may be stored in the ROM 811b. It shall be appreciated that similar components can be provided in a control apparatus provided elsewhere in a network system, for example in a core network entity. The control apparatus 800 can be interconnected with other control entities. The control apparatus 800 and functions may be distributed between several control units. In some embodiments, a base station can comprise a control apparatus. In alternative embodiments, two or more base stations may share a control apparatus.

Figure 2:
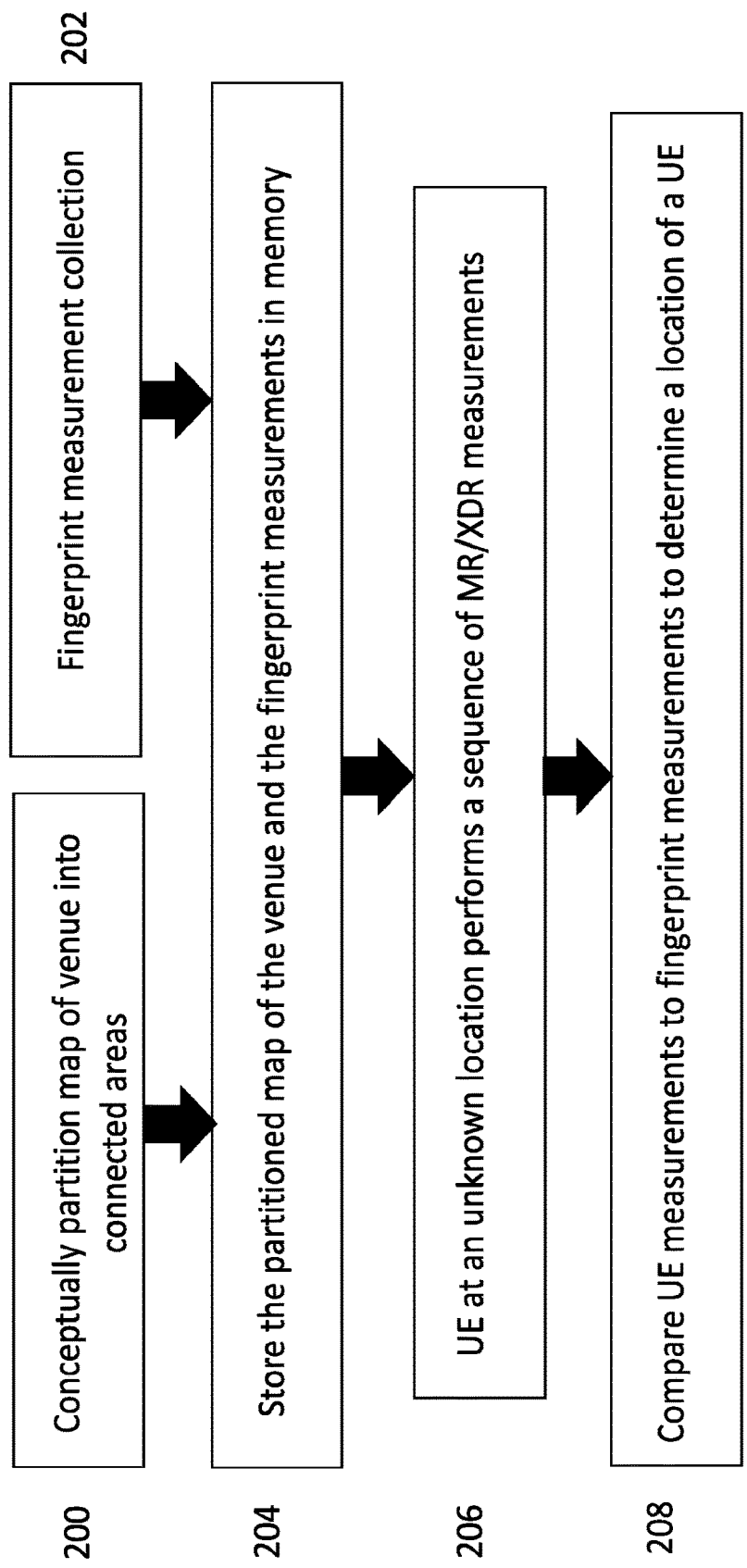
FIG. 2 shows a flowchart of a method according to some embodiments.

FIG. 2 shows an example method for determining a location of a UE in a venue according to some embodiments.

Each box may contain one or more measurement points corresponding to a physical location within the venue.

Figure 3:
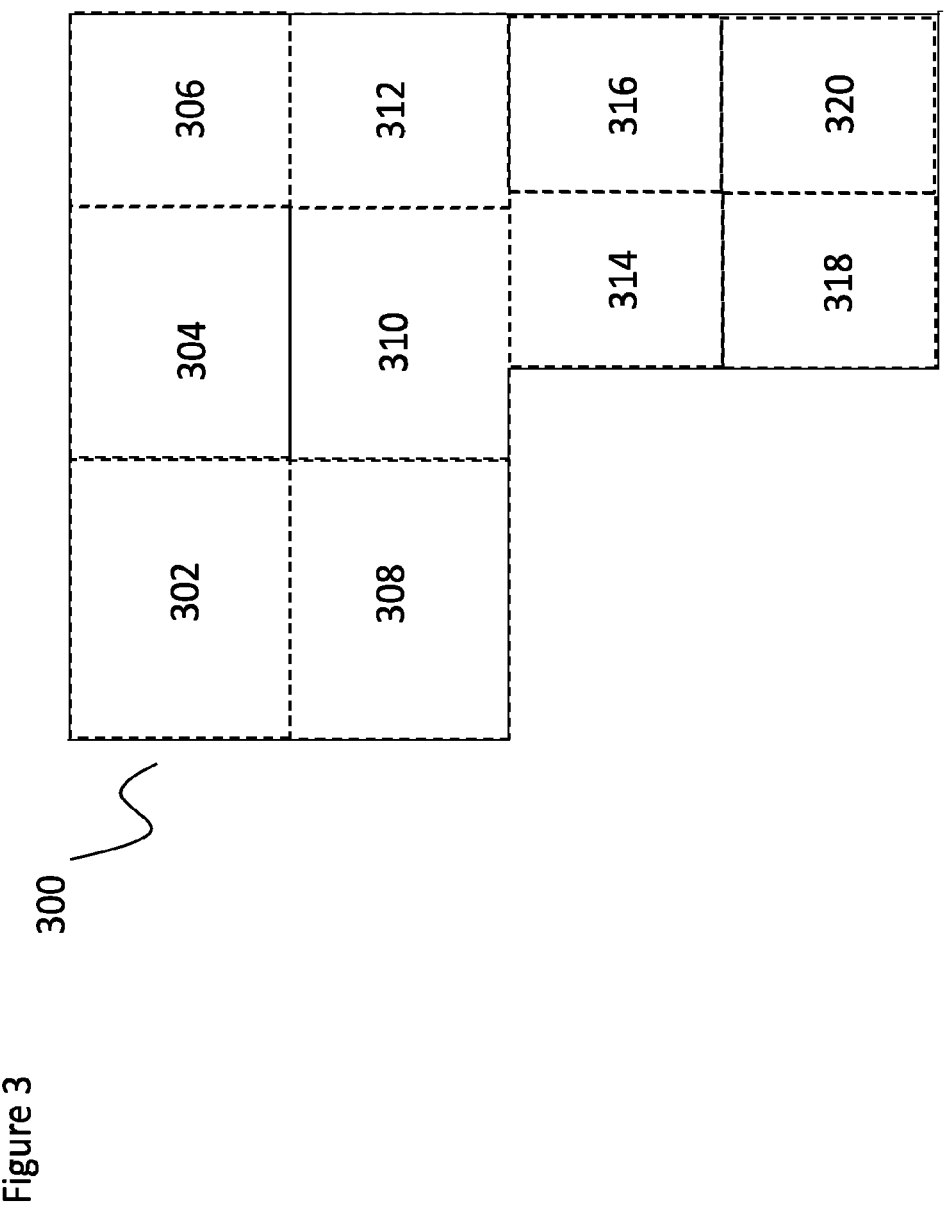
FIG. 3 shows the partitioning of a venue into a plurality of boxes.

In step 200, a map of the venue may be conceptually partitioned into a plurality of several connected areas. These areas are termed boxes. This is shown schematically in FIG. 3, where a map of a venue 300 is broken down into boxes 302-320. In this example, the map has been broken down into 10 boxes, however it should be understood that any number of boxes may be used. Furthermore, the boxes may be any suitable size and shape, and the size and shape may vary between boxes.

In step 202, RSRP measurements may be captured from a plurality of measurement points located within the venue. These measurements are termed fingerprint RSRP measurements. The fingerprint RSRP measurements may be stored in a fingerprint measurement database along with the measurement point at which a respective fingerprint measurement was obtained.

Figure 4A:
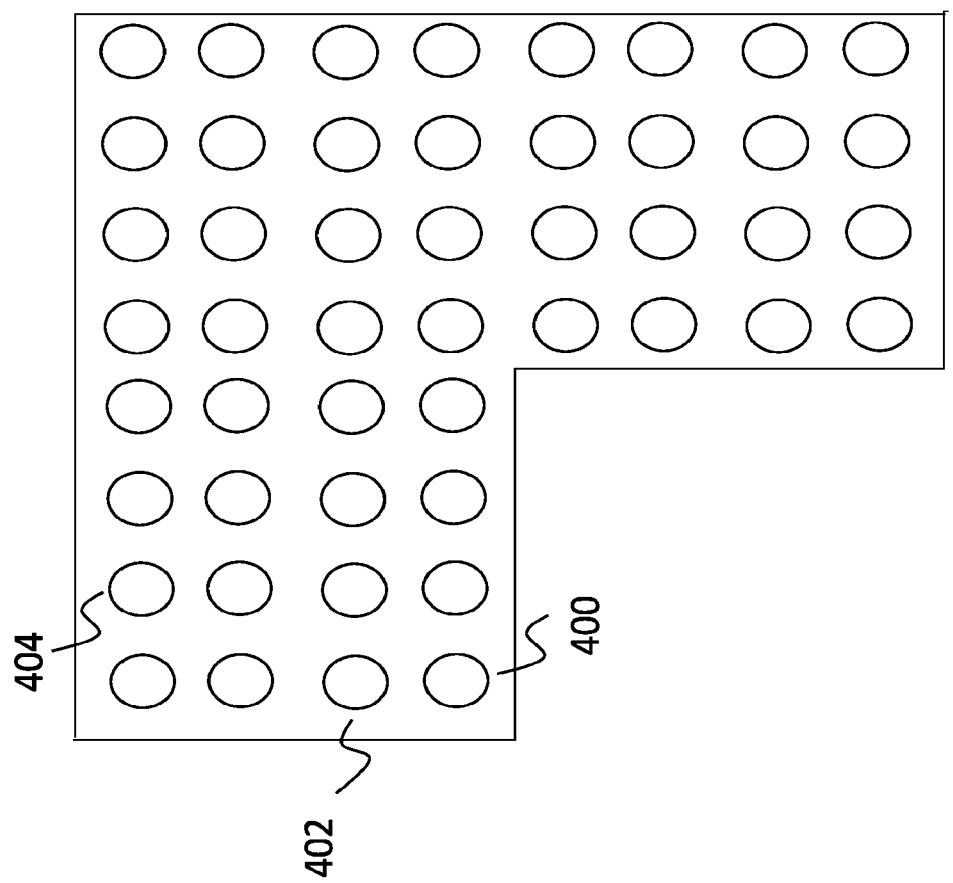
FIG. 4a shows a plurality of fingerprint measurement points within a venue.

FIG. 4a shows an example of a distribution of points from which a fingerprint measurement may be taken within the venue, where the measurement points are depicted by circles. Three example measurement points 400, 402 and 404 are labelled. It should be understood that the distribution of measurement points may be any suitable distribution, and may not be even or symmetrical. For example, in a venue with dedicated walkways, there may be a higher concentration of measurement points along the walkways than in less easily accessible positions within the venue.

In some embodiments, fingerprint measurements may be filtered. The filtering may be to remove noise from the measurements. In some embodiments, the filter may comprise a Kalman filter.

In some embodiments, the partitioning of the map of the venue into connected areas, and the fingerprint measurements may be stored in memory. This is shown as step 204 in FIG. 2.

It should be understood that steps 200 and 202 may be performed in any order, and in some embodiments may be performed simultaneously.

Figure 4B:
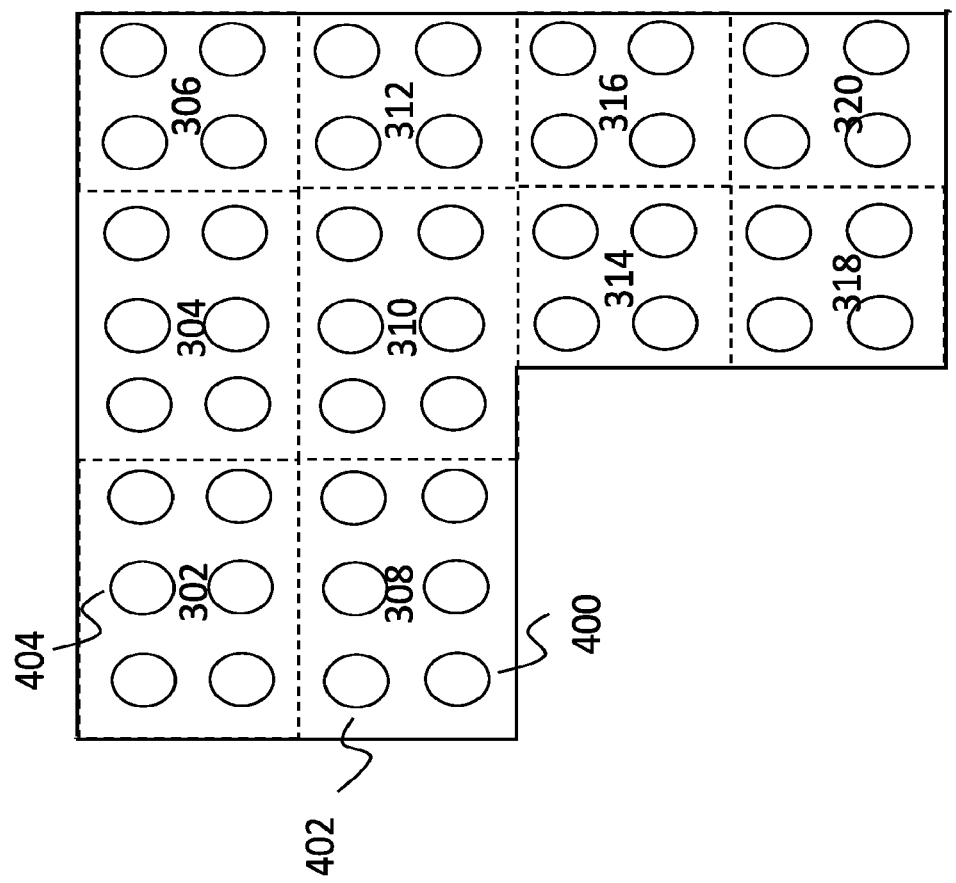
FIG. 4b shows the plurality of fingerprint measurement points divided into boxes within the venue.

In some embodiments, the measurement at points obtained in step 202 and the partitioning of the venue into boxes performed in step 200 may be combined to create a distribution of measurement points partitioned within boxes. Thus, for example, it may be determined that measurement points 400 and 402 are partitioned within box 308, measurement point 404 is partitioned within box 302, and so on. This is shown in FIG. 4b.

In step 206, a UE may perform a sequence of MR/XDR measurements. That is to say, in some embodiments, the UE may perform a first MR/XDR measurement at a first time, and a second MR/XDR measurement at a second time point. The sequence of MR/XDR measurements and the timestamps of the measurements may be used to determine a location of the UE within the venue.

In step 208, the method may comprise comparing UE MR/XDR measurements from an unknown location to the fingerprint RSRP measurements to determine a location of the UE.

In some scenarios, the fingerprint RSRP measurements may not be unique to the point at which the measurements are captured. That is to say, a fingerprint RSRP measurement of a first point may match a fingerprint RSRP measurement of at least a second point. For example, measurements at points 400, 402 and 404 may return the same value, which may be a first value.

As such, it may not be possible to accurately determine a location of a UE by simply comparing a measured MR/XDR measurement to the known fingerprint measurements. There may therefore be uncertainty in the UE location. For example, where a UE measurement returns the first value, it is not possible to determine whether the UE is at point 400, 402 or 404.

In order to overcome the uncertainty in UE location caused by identical RSRP measurements at different points, in some embodiments the sequence of MR/XDR measurements may be input into a Hidden Markov Model (HMM).

A HMM may have a visible sequence of observations, and a hidden or unknown sequence. In some embodiments, the visible sequence of observations may comprise MR/XDR measurements, and the hidden sequence may comprise the measurement points.

In some embodiments, the HMM may use the following probability matrices to determine a model for determining a location of a UE based on MR/XDR measurements:

- A transition probability matrix (A), which provides information about the probability of a UE moving from one box to another box;
- An emission probability matrix (B), which provides information about the probability of a specific MR/XDR being matched from one specific box; and
- An initial state probability matrix (P), which provides information about the probability of one specific box being the first box of a sequence of MR/XDR measurements.

In some embodiments, the transition probability matrix A represents the probability of a UE accessing each box during a time interval between a first timestamp and a second timestamp in the MR/XDR sequence.

For example, in a measurement sequence having time t, a total accessible area of a UE may be denoted by $S_i$. An accessible area of box j if starting from box i may be denoted by $s_{ji}$. The transition probability $A_{i-j}$ from box i to box j in time t may then be calculated as:

$$A_{i-j} = \frac{s_{ji}}{S_i}$$

In some embodiments, the velocity and/or orientation of the UE may be used to determine the transition probability. In some embodiments, the transition probability may be determined using history information about one or more UEs stored in a history database. In some embodiments, matrix A is determined using data mining and/or machine learning techniques.

In some embodiments, the emission probability matrix represents the probability of a specific MR/XDR measurement being matched from one specific box. In some embodiments, for a given box i, the total number of fingerprint points within the box is $M_i$. Among these $M_i$ points, there may be $m_i$ fingerprint measurement points that match a specific MR/XDR measurement. The emission probability Bi of box i may then be calculated as:

$$B_i = \frac{m_i}{M_i}$$

Figure 6A:
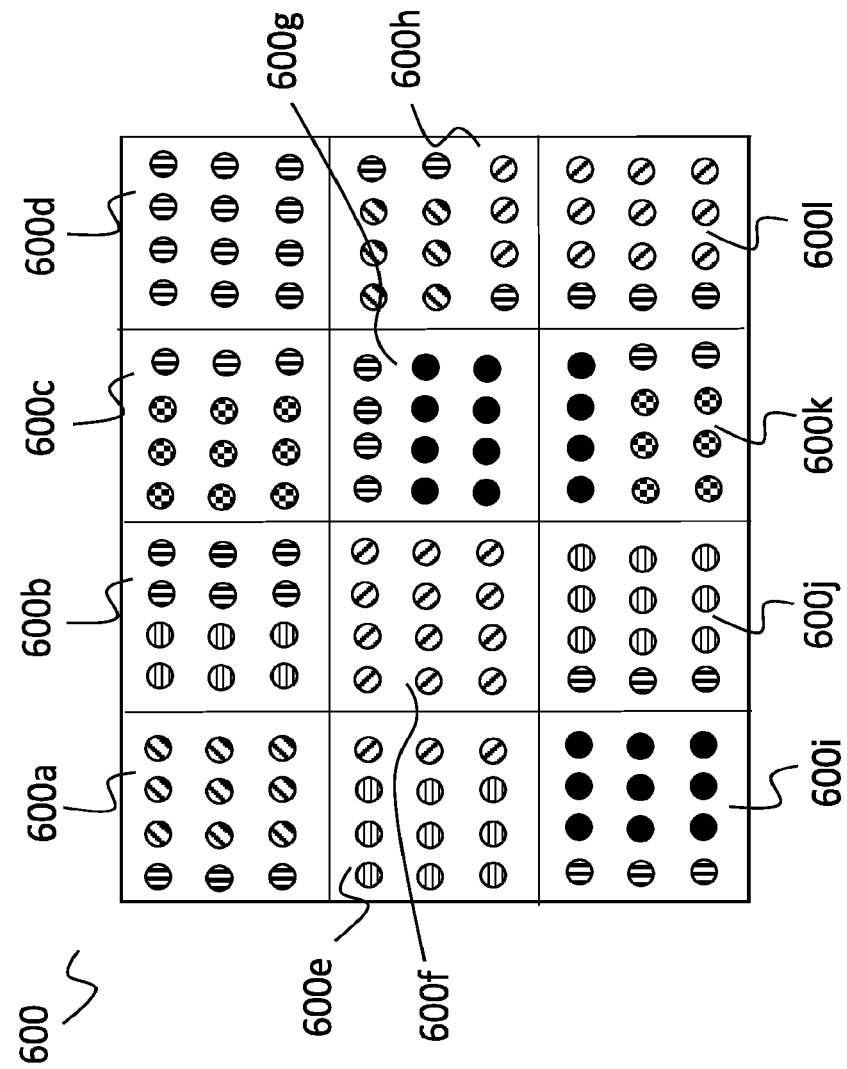
FIGS. 6a-d shows an example of tracking a location of a UE within a venue.
Figure 6B:
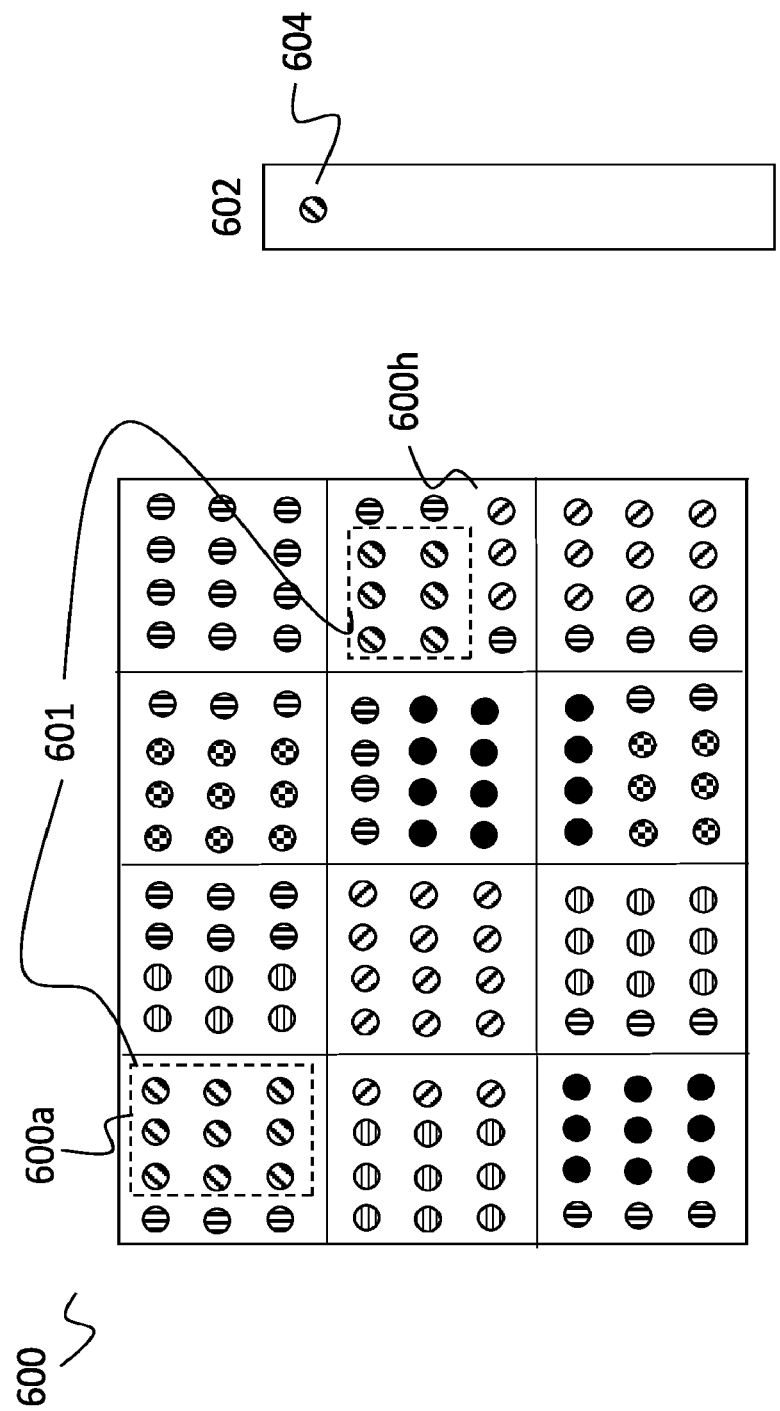

For an example in FIG. 6b, in box 600a, there are total 12 fingerprint points, then $M_i=12$. For an input MR/XDR 604, there are 9 fingerprint RSRP measurement points in box 600a that match this MR/XDR 604, then $m_i=9$. The emission probability Bi of box 600a is:

$$B_i = \frac{m_i}{M_i} = \frac{9}{12} = 0.75$$

In some embodiments, the initial state probability matrix P represents the probability of one specific box being a first box of a sequence of MR/XDR measurements. The initial state probability matrix defines the probability of a starting point. In some embodiments, the starting point is identified by a unique matching. That is to say, for example, an entrance into a venue may have a unique RSRP measurement associated with it, thereby allowing unique identification of a start point. In some embodiments, the initial state probability is equal for all boxes.

In step 206, the sequence of MR/XDR information may be input in to the HMM. The HMM may then determine a probability of a location and/or route taken by the UE based on the received MR/XDR sequence and the matrices A, B and P.

In some embodiments, the HMM may determine a probability of a location and/or route taken by the UE by determining a probability of all possible routes between boxes and determine the route with the highest probability.

In some embodiments, the HMM may determine a most likely route based on the most likely route determined at a previous point in time. That is to say, in some embodiments, a most likely route at time interval T may be determined based on a most likely route at time interval (T−1).

In step 208, the HMM may output the most likely location of the UE. In some embodiments, the most likely location may comprise a most likely box.

In some embodiments, a sequence of boxes may be output. The sequence of boxes may represent a most likely path of a UE based on the received MR/XDR measurements in the received MR/XDR sequence.

In some embodiments the determined location and/or determined route may be displayed visually. For example, a sequence of boxes indicating the determined route taken by the UE may be displayed on a map of the venue.

In some embodiments, by comparing the received MR/XDR sequence and the fingerprint measurement database, points within a box that match the received sequence may be determined. In some embodiments, a single point for a given timestamp in the sequence may be determined. The determined point may be a point with a minimum average error. The determined point may be determined by using the k nearest neighbour method.

In some embodiments the determined point for each given timestamp may be connected to form a determined route. The determined route may be determined using a Dijkstra shorted connected path algorithm.

In some embodiments, the determined route may be output. In some embodiments, the determined route may be displayed visually.

An example illustration of the method described above is shown in FIGS. 6a-d.

FIG. 6a shows an example where a venue 600 has been partitioned into 12 boxes 600a-l. Each box has 12 fingerprint measurement points represented by circles, where the RSRP measurement at each point is represented by the pattern of the circle. In the example of FIG. 6a, there are 6 different fingerprint RSRP measurements, and thus there are 6 different patterns.

In FIG. 6b, a MR/XDR sequence 602 may be received from a UE located somewhere within the venue. The first MR/XDR measurement at timestamp T1 may have a MR/XDR measurement 604. Thus, it can be determined that the UE is located very close to one of the points 601. However, without further information, it may not be possible to more accurately determine the location of the UE. That is to say, it may not be possible to determine, from a single measurement, whether the UE is in box 600a or 600h.

In this case, the matrix B, defining the emission probability of a given box, may be determined based on the previously mentioned formula. Thus, the emission probability of box 600a may be determined as 9/12 as there are 9 points in box 600a that have a fingerprint RSRP measurement corresponding to MR/XDR measurement 604, and there are total 12 points in the box 600a.

Similarly, it may be determined that box 600h has an emission probability of 6/12. All other boxes have an emission probability of 0, as the other boxes do not have any points at which a fingerprint RSRP measurement corresponds to the received MR/XDR measurement 604 received from the UE.

Figure 6C:
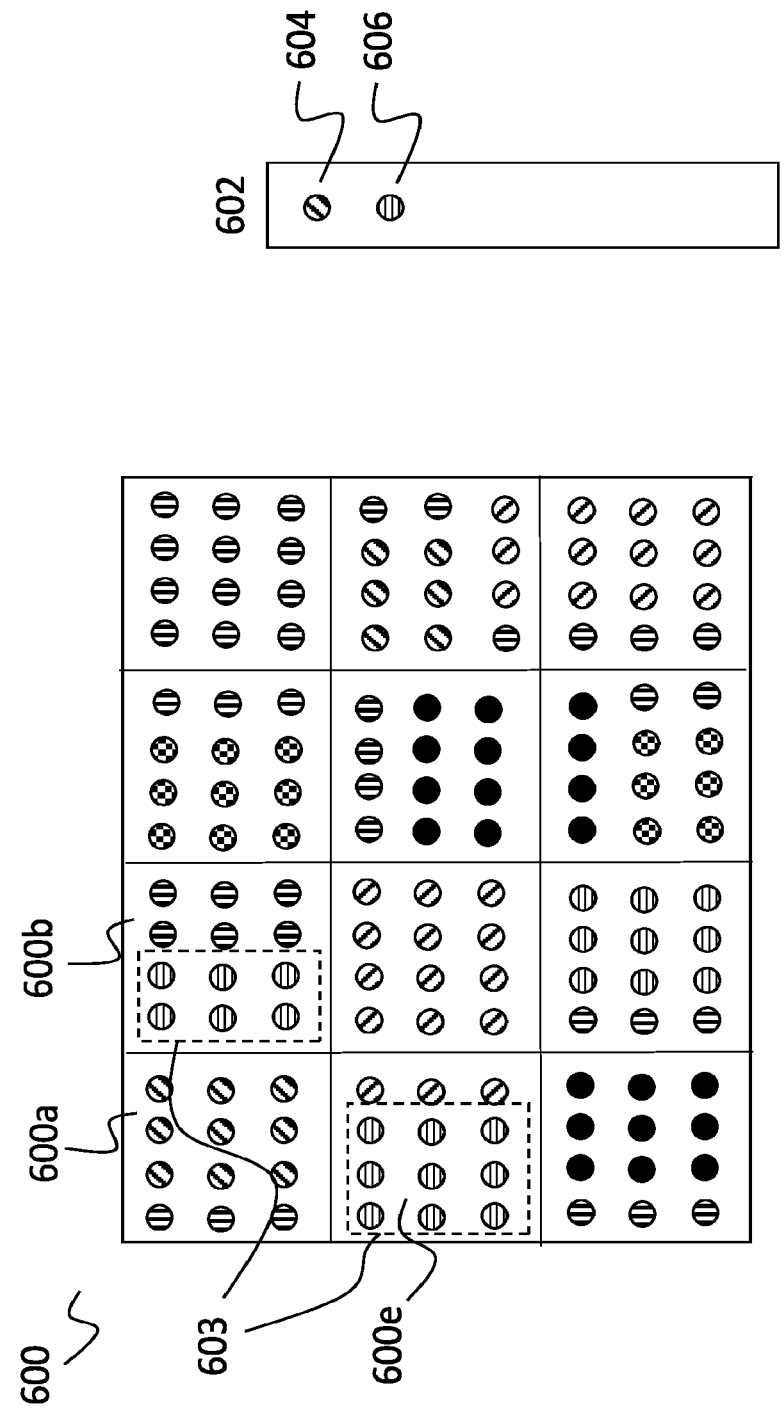

In FIG. 6c, a second MR/XDR measurement 606 may be received at timestamp T2. The second MR/XDR measurement may have a MR/XDR measurement 606 that corresponds to fingerprint RSRP measurements obtained at one of points 603.

Thus it may be determined that a UE is now located very close to one of points 603. Based on this measurement and the previous measurement, it may be determined that the UE started in box 600a rather than 600h. However, it may not be possible to determine whether the UE has moved into box 600b or 600e, as both boxes contain points at which the fingerprint RSRP measurement matches the MR/XDR measurement received from the UE, and both are accessible from a box that was determined at a previous timestamp (i.e. box 600a) to be a possible location of the UE.

Figure 6D:
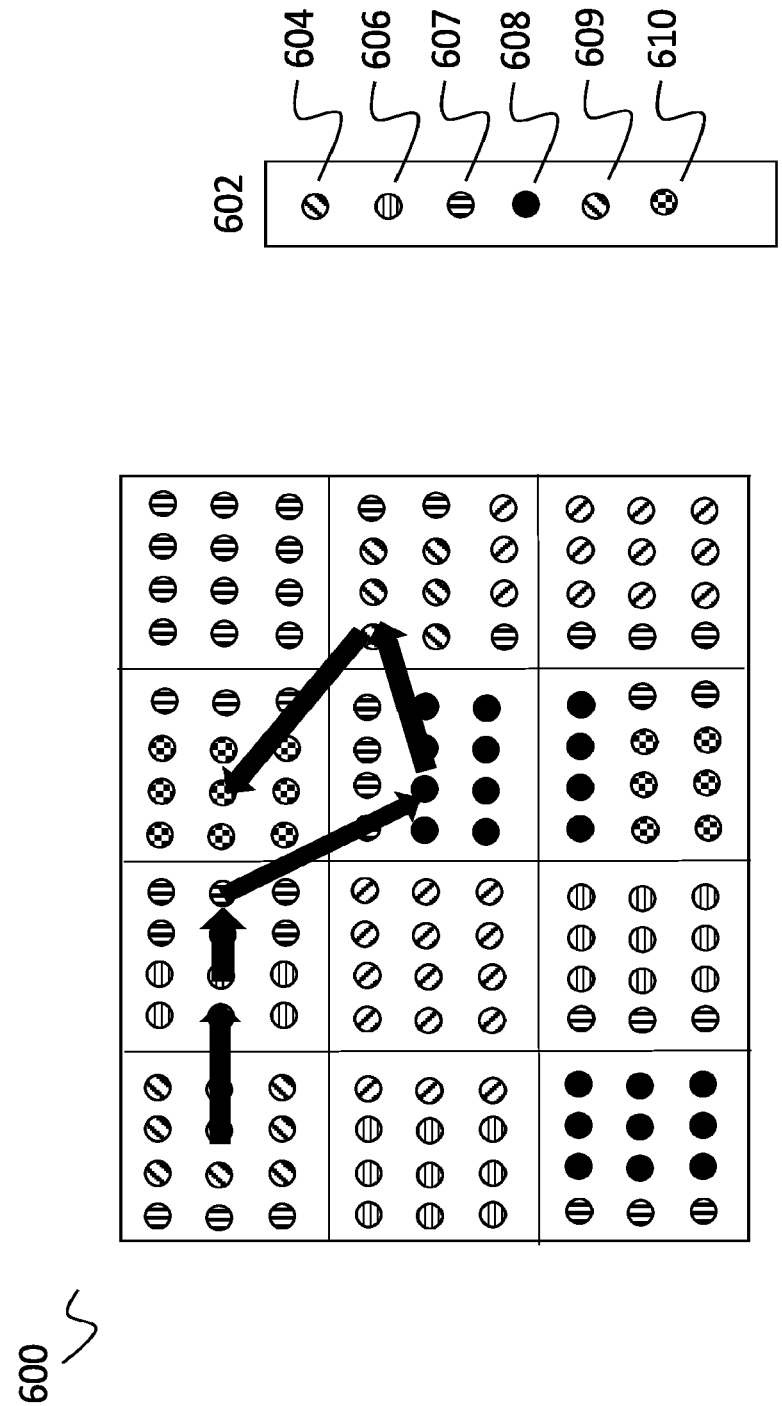

FIG. 6d shows subsequent MR/XDR measurements 607-610 that are received in a sequence at successive timestamps. Using these measurements, by calculating the route with the largest probability (which, in some embodiments, may be calculated by multiplying the corresponding emission probability and transition probability), the method may determine a most likely route that a UE has taken through the venue. In FIG. 6d, this route is indicated by the arrows in bold on the map of the venue.

This route may then be output, and for example displayed on a screen of a device.

In some embodiments, by grouping fingerprint measurement points into a box and determining an emission probability of a given box, uncertainty in the location of a UE may be accounted for.

In some embodiments a most likely box is determined when determining a location of a UE. In some embodiments, this may provide a reduction in computing time for determining a location of a UE in comparison to determining a most likely single point.

In some embodiments, information may be used to augment the MR/XDR measurements provided by a UE to provide a more accurate estimation of a UE location. Examples of augmenting information may include, but may not be limited to, a previous MR/XDR measurement or measurements, a map of the venue, a velocity of the UE, a direction of travel of the UE. In some embodiments, the augmenting information may be determined by data mining and/or machine learning.

A further example of a method according to some embodiments is now described to provide further explanation to the operation of the Hidden Markov Model.

In some embodiments, the Hidden Markov Model map comprise a transition probability matrix (A), an emission probability matrix (B), and an initial state probability matrix (P) as described above. In some embodiments, the HMM may receive a sequence of MR/XDR measurements from a UE, the sequence designated $O=(o_1, o_2 \ldots o_k)$.

The output of the HMM may be a hidden sequence that represents a sequence of boxes having a highest probability. The output sequence is designated $I^*=\{i^*_1, i^*_2 \ldots i^*_k\}$. $i^*$ is the index of the box in the predicted route.

In some embodiments, the HMM may determine, for an initial measurement $o_1$, an initial box (t=1) as:

$$\delta_1(i) = P_i B_i(o_1), i = 1, 2 \ldots N$$

$$\varphi_1(i) = 0, i = 1, 2 \ldots N$$

where N is the number of boxes.

In some embodiments, the HMM may then determine subsequent boxes for t=2, 3 . . . k with dynamic programming as:

$$\delta_t(i) = \max_{1 \le j \le N} \{\delta_{t-1}(j) A_{ji}\} B_i(o_t), i = 1, 2 \ldots N$$

$$\varphi_t(i) = \arg \max_{1 \le j \le N} \{\delta_{t-1}(j) A_{ji}\}, i = 1, 2 \ldots N$$

In some embodiments, the HMM may determine the highest probability at time t=k as:

$$F^* = \max_{1 \le i \le N} \delta_k(i)$$

In some embodiments the HMM may determine the location of the UE at time t=k as:

$$i^*_k = \arg\max_{1 \le i \le N} \{\delta_k(i)\}$$

In some embodiments, the HMM may determine the location of the UE at earlier time points, i.e. t=(k−1), (k−2) . . . 1 as:

$$i^*_t = \varphi_{t+1}(i^*_{t+1})$$

In some embodiments, the HMM may therefore determine the sequence of locations of the UE at the respective timestamps as:

$$I^* = \{i^*_1, i^*_2, \ldots, i^*_k\}$$

Figure 7:
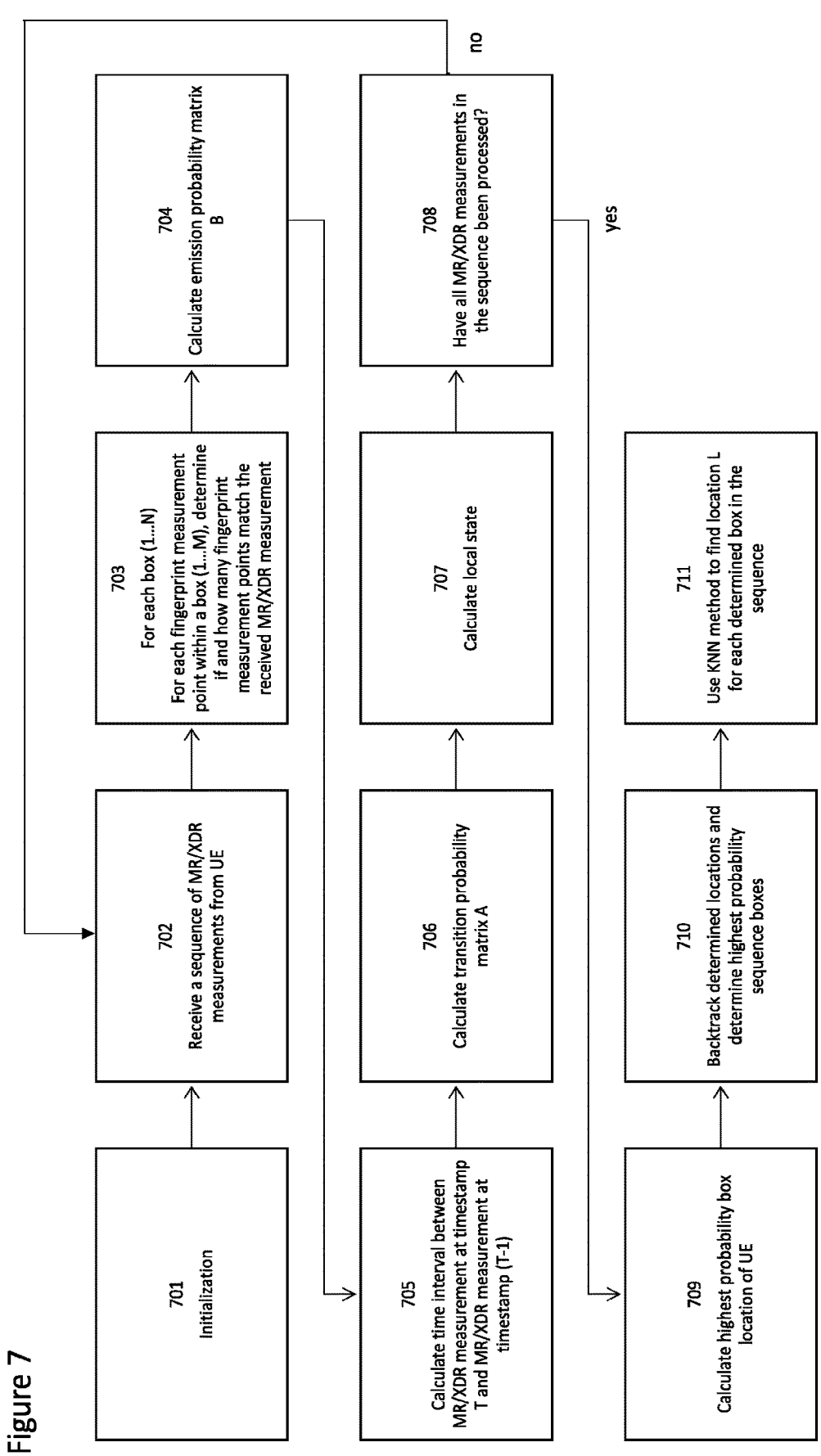
FIG. 7 shows a method according to some embodiments.

A method according to some embodiments is shown in FIG. 7.

At step 701, the method may comprise initializing the HMM.

At step 702, the method may comprise receiving a MR/XDR measurement from a UE.

At step 703, the method may comprise determining how many fingerprint measurement points within a box match the received MR/XDR measurement. This may be done for all boxes 1 . . . N within the venue.

At step 704, the method may comprise determining the emission probability matrix B.

At step 705, the method may comprise calculating a time interval between one MR/XDR measurement at timestamp T and a subsequent MR/XDR measurement at timestamp T−1.

Each leaky cable may receive a signal from a different base station. Thus each leaky cable 1008a-f may carry a different signal. In this example there are 12 gaps in the leaky cable system (as there are six cables and two gaps in each cable).

As shown in the following table of cell deployment information, each leaky cable 1008a-f may work on two different frequency channels. The two gaps in the same leaky cable may share the same physical cell identifier (PCI) and the same two frequency channels.

| Cell Global Identifier (CGI) | Section name in map | Network element type (G/D/T/L) | Main frequency point | Physical Cell Identifier (PCI) | Frequency channel | Corresponding Leaky cable |
|---|---|---|---|---|---|---|
| 101097-33 | A0 District 1 | L(E) | 38950 | 268 | E1 | 1008a |
| 101097-43 | A0 District 1 | L(E) | 39148 | 268 | E2 | 1008a |
| 948934-131 | A0 District 6 | L(D) | 37900 | 196 | D1 | 1008b |
| 948934-137 | A0 District 6 | L(D) | 38098 | 196 | D2 | 1008b |
| 948934-129 | A0 District 4 | L(D) | 37900 | 198 | D1 | 1008c |
| 948934-135 | A0 District 4 | L(D) | 38098 | 198 | D2 | 1008c |
| 555723-2 | A0 District 5 | L(D) | 37900 | 65 | D1 | 1008d |
| 555723-5 | A0 District 5 | L(D) | 38098 | 65 | D2 | 1008d |
| 948934-134 | A0 District 3 | L(D) | 37900 | 193 | D1 | 1008e |
| 948934-140 | A0 District 3 | L(D) | 38098 | 193 | D2 | 1008e |
| 948934-133 | A0 District 2 | L(D) | 37900 | 195 | D1 | 1008f |
| 948934-139 | A0 District 2 | L(D) | 38098 | 195 | D2 | 1008f |

At step 706, the method may comprise calculating the transition probability matrix A.

At step 707, the method may comprise calculating the local state $\delta_t(i)$ and $\varphi_t(i)$.

At step 708, the method may comprise determining whether all MR/XDR measurements in a sequence have been processed. If all measurements have been processed, then the method may proceed to step 709. If not all measurements have been processed, the method may return to step 702.

At step 709, the method may comprise determining a highest probability box location of the UE for the last MR/XDR measurement in the received sequence.

At step 710, the method may comprise backtracking and determining a highest probability sequence of box locations of the UE.

At step 711, the method may comprise using a k nearest neighbour (KNN) method to find a location L of the UE for each determined box in the sequence.

An exemplary use case is now provided. It should be understood that this is for the purposes of illustration only, and should in no way be considered limiting.

Figure 10A:
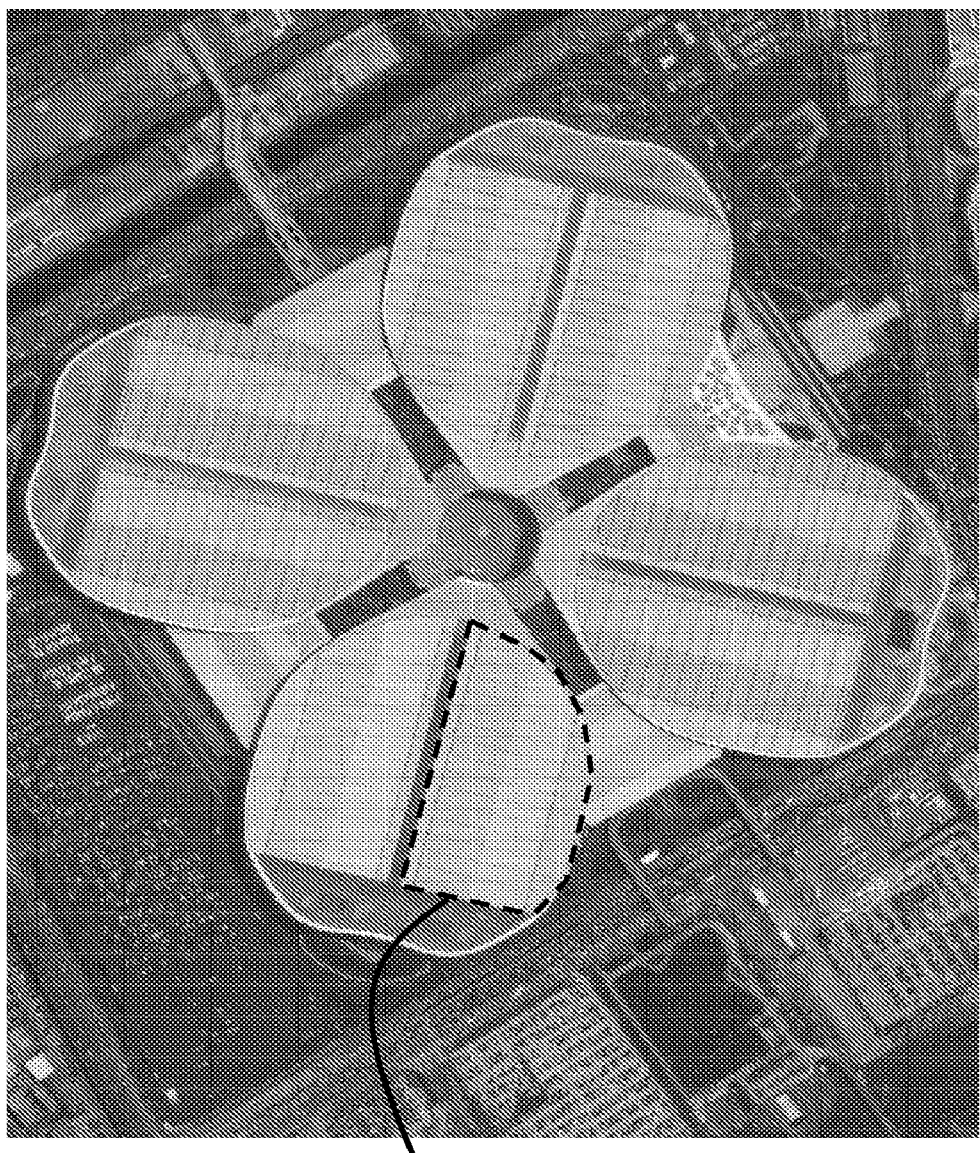
FIGS. 10a-d show an example distribution of leaky cables in an example venue.
Figure 10B:
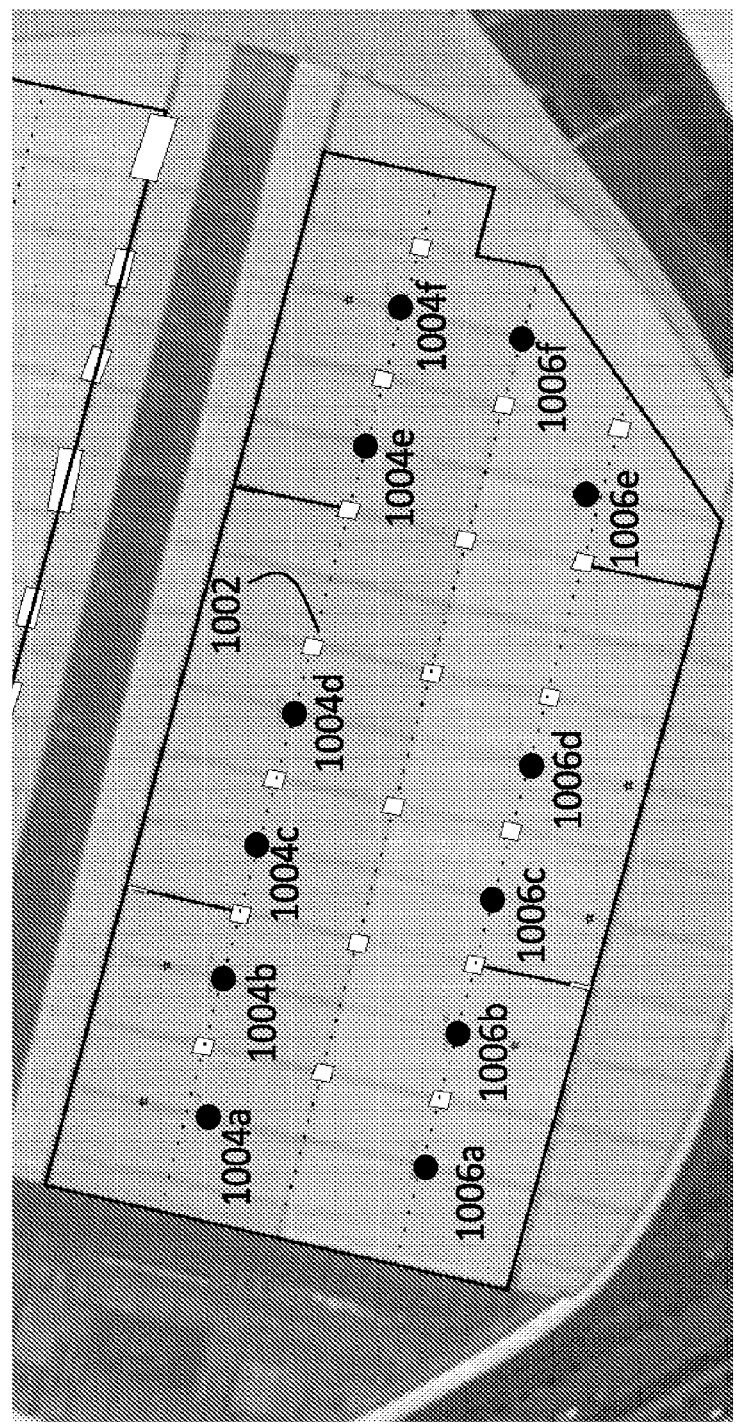
Figure 10C:
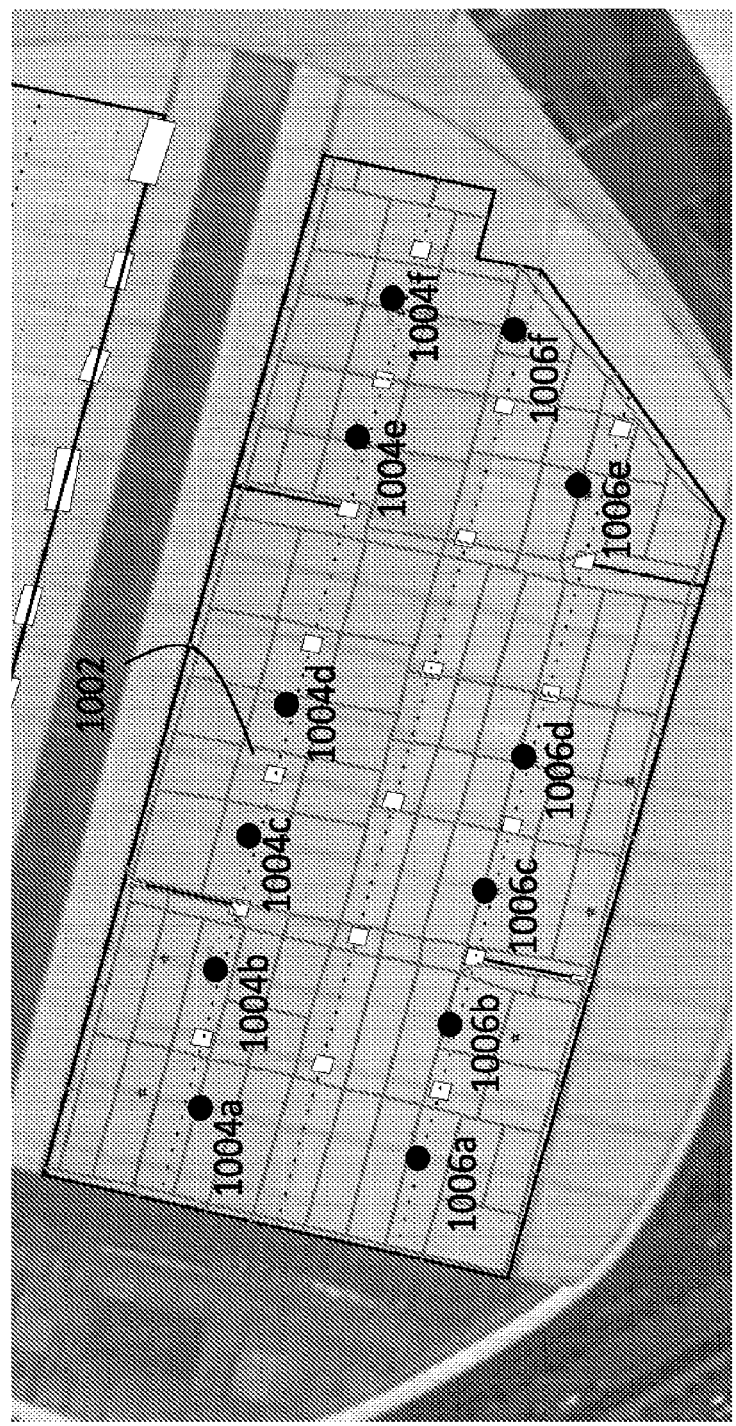

FIG. 10a shows a satellite image of a venue. FIG. 10b shows a closer image of the portion of the venue indicated by the dashed line 1000 in FIG. 10a. FIG. 10c shows all walkways through the portion of the venue shown in FIG. 10b. In FIGS. 10b and c, the white squares 1002 correspond to physical features of the venue—in this case, physical pillars. The points labelled 1004a-f and 1006a-f correspond to gaps in a leaky cable.

Figure 10D:
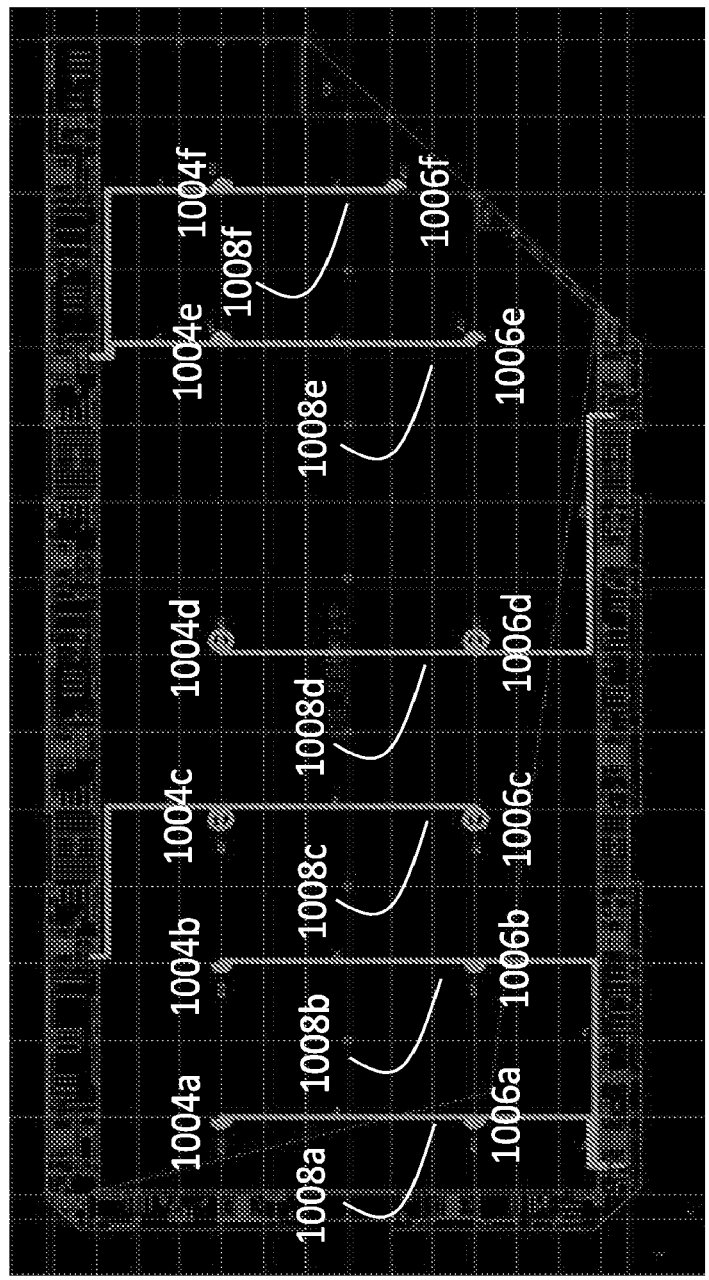

FIG. 10d shows a deployment of leaky cables in the portion of the venue shown in FIG. 10b. In FIG. 10d, there are six cables 1008a-f. Each of the cables has two gaps, indicated by the grey circles in FIG. 10d, which correspond to points 1004a-f, 1006a-f.

It should be understood that the above cell deployment information is provided by way of example only, and should in no way be construed as limiting.

Fingerprint RSRP measurements may be taken from a plurality of fingerprint measurement points throughout the portion of the venue shown in FIG. 10b. The number of fingerprint measurement points may be dependent on a desired accuracy of the determined UE location. For example, the total number of fingerprint RSRP measurement points may exceed 80,000.

In some embodiments, there is provided an apparatus comprising means for tracking a UE. In some embodiments, the means for tracking the UE may be configured to perform any of the method steps described above.

Figure 5:
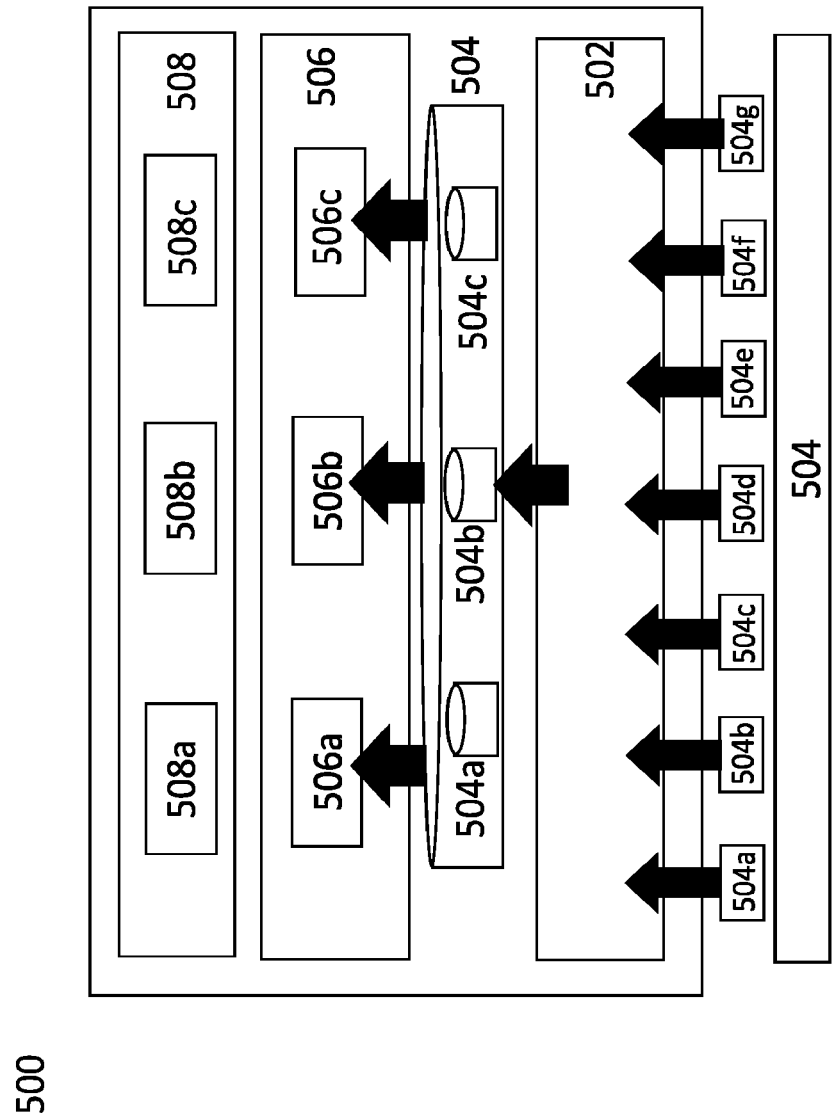
FIG. 5 shows an apparatus according to some embodiments.

In some embodiments there is provided an apparatus comprising a localization and tracking system. A representation of the localization and tracking system is shown in FIG. 5.

In some embodiments the localization and tracking system 500 may comprise a log collector 502. The log collector may receive information 504 from a device. In some embodiments, the device may be a UE. The received information may comprise at least one of the following:

An MR/XDR measurement 504a from a UE at an unknown location;

A fingerprint measurement 504b comprising a fingerprint RSRP measurement from a UE at a known location;

Information defining the model and/or the matrices A, B and P 504c;

A map of the venue 504d;

Information defining the distribution of boxes in the venue 504e;

A velocity of the UE 504f; and

A thermodynamic chart of the venue 504g.

In some embodiments, the log collector 502 may store the received information in one or more databases 506. For example, the log collector may store fingerprint measurements in a fingerprint database 506a, and/or may store the received map in a map database 506b, and/or may store information such as the model in a model database 506c. It should be understood than any number of databases, arranged in any given fashion, may be used to store the received information 504.

In some embodiments the localization and tracking system may comprise a system management module 506.

In some embodiments the system management module 506 may comprise a location management module 506a. The location management module 506a may access information stored in the one or more databases 506. In some embodiments, the location management module 506a may access information stored in the fingerprint database 504a.

In some embodiments the system management module 500 may comprise a tracking management module 506b. The tracking management module 506b may access information stored in the one or more databases 504. In some embodiments the tracking management module 506b may access information stored in the map database 506b.

In some embodiments the system management module 500 may comprise a model management module 506c. The model management module 506c may access information related to the box distribution within the venue. The model management module may also access information related to the velocity of the UE. The model management module may also access the information defining the model and/or the matrices A, B and P. The model management module may also access information related to past locations of the UE. Some of this information may be stored in the model database 504c.

In some embodiments the localization and tracking system 500 may comprise a calculation module 508. The calculation module 508 may be configured to perform a probability calculation to determine a location of a UE.

In some embodiments the calculation module 508 may comprise a location prediction module 508a. In some embodiments the calculation module 508 may comprise a tracking prediction module 508b. In some embodiments the calculation module 508 may comprise a module executor 508c. In some embodiments, these module may be provided in one or more of a base station, a data server, and a cell phone.

In some embodiments, the location prediction module 508a may receive at least one input from the log collector 502 and the database storing the fingerprint measurements.

In some embodiments, the location prediction module 508a may extract RSRP signals and associated timestamps from the received MR/XDR sequence. The location prediction module 508a may compare the extracted RSRP signals to the fingerprint RSRP measurements stored in the database, and output at least one identifier corresponding to at least one fingerprint measurement point which has a fingerprint RSRP measurement that matches the extracted RSRP signals.

In some embodiments, the location prediction module 508a may output the at least one identifier to the module executor 508b.

In some embodiments, the module executor 508b may receive at least one input from at least one of the log collector, historical information stored in the at least one database, the output from the location prediction module 508a, and an output from the tracking prediction module 508c. In some embodiments the module executor 508b may be configured to receive the initial state probability matrix P from the tracking prediction module 508c.

In some embodiments the module executor 508b may be configured to calculate the emission probability matrix B. In some embodiments, the emission probability matrix may be calculated based on the received input from the location prediction module 508a. The module executor 508b may be configured to calculate the transition probability matrix A. In some embodiments, the transition probability matrix may be calculated based on an input from the tracking prediction module 508c. In some embodiments, the transition probability matrix may be calculated based on additional information, such as but not limited to the velocity of the UE, historical information about the UE, information about the venue etc.

In some embodiments, the module executor 508b may be configured to calculate the local state in the Hidden Markov Model. The local state may correspond to a determined most likely location of a UE.

In some embodiments, the module executor 508b may output a sequence of boxes with a highest probability to the tracking prediction module 508c.

In some embodiments, the tracking prediction module 508c may receive at least one input from at least one of the log collector, the at least one database, and the module executor. The tracking prediction module 508b may be configured to provide an output to the module executor.

In some embodiments the tracking prediction module may be configured to partition the map of the venue into the plurality of boxes. The tracking prediction module may be configured to associate an identifier of a fingerprint measurement point with one of the plurality of boxes.

In some embodiments the tracking prediction module may be configured to determine the initial state probability matrix P.

In some embodiments, the tracking prediction module may be configured to output physical location relations between boxes to the module executor 508b.

In some embodiments, the tracking prediction module may be used to analyse the determined sequence of boxes output from the module executor 508b. In some embodiments, the tracking prediction module 508c may use a k nearest neighbour method to determine a fingerprint measurement point in each box in the determined sequence of boxes. In some embodiments, the tracking prediction module 508c may use a Dijkstra shortest connected path algorithm to output a tracking prediction.

In the prior description, reference has been made to MR/XDR measurements. It should be understood that any suitable signal characteristic measurement may be performed.

Figure 9:
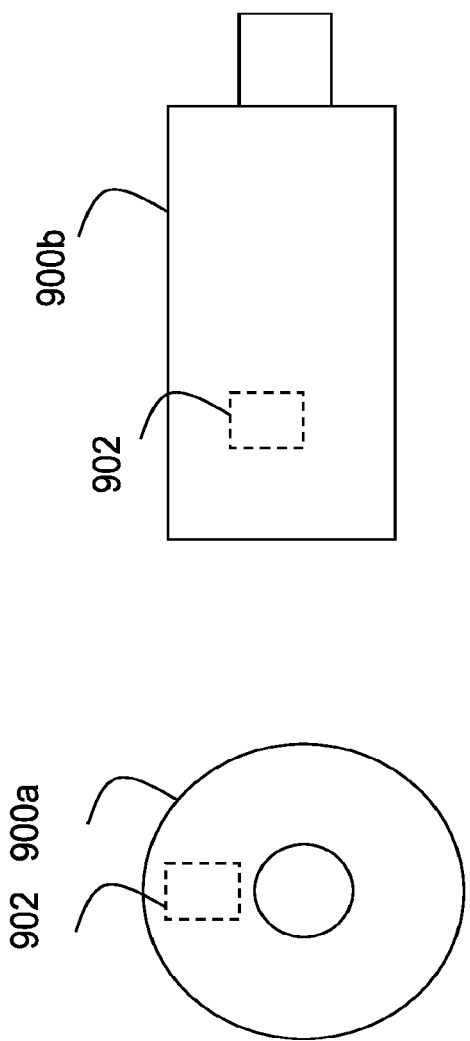
FIG. 9 shows a representation of a non-volatile memory medium storing instructions which when executed by a processor allow the processor to perform one or more of the method steps according to some embodiments.

FIG. 9 shows a schematic representation of non-volatile memory media 900a (e.g. computer disc (CD) or digital versatile disc (DVD)) and 900b (e.g. universal serial bus (USB) memory stick) storing instructions and/or parameters 902 which when executed by a processor allow the processor to perform one or more of the steps of the method previously described.

In general, the various embodiments may be implemented in hardware or special purpose circuits, software, logic or any combination thereof. Some embodiments may be implemented in hardware, while other aspects may be implemented in firmware or software which may be executed by a controller, microprocessor or other computing device, although the embodiments are not limited thereto. While various aspects may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Some embodiments may be implemented by computer software executable by a data processor of a device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Some embodiments may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiments. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

What is claimed is:

1. A method comprising:
receiving at least one measured signal characteristic from a user equipment, the user equipment being located at a user equipment location, wherein the at least one signal characteristic is filtered;
comparing the at least one measured signal characteristic to at least one of a plurality of signal characteristics, each signal characteristic from the plurality of signal characteristics being associated with a respective measurement point;
determining, based on the comparing, a probability that the user equipment location is a first location;
receiving a sequence of signal characteristic measurements as part of a measurement report (MR)/call/transaction detail report (XDR), the sequence of signal characteristic measurements comprising at least a first measurement at a first timestamp and a second measurement at a second timestamp, wherein the first measurement and the second measurement comprise reference signal receiver power (RSRP) values, wherein the MR comprises a list of one or more RSRP values, and the XDR comprises one or more serving cell RSRP values; and
determining a location of the user equipment by comparing at least one user equipment MR/XDR measurement from an unknown location to at least one fingerprint RSRP measurement.

2. A method as claimed in claim 1, wherein the user equipment location is a location of a user equipment within a venue.

3. A method as claimed in claim 2, comprising conceptually partitioning the venue into a plurality of sections.

4. A method as claimed in claim 3, wherein each section of the plurality of sections comprises one or more measurement points.

5. A method as claimed in claim 1, comprising storing the plurality of signal characteristics and the respective measurement point associated with a respective signal characteristic in a database.

6. A method as claimed in claim 1, wherein a distribution of measurement points is dependent on a layout of the venue.

7. A method as claimed in claim 1, comprising inputting the sequence of signal characteristic measurements into a Hidden Markov Model.

8. An apparatus comprising at least one processor; and at least one memory including computer program code; the at least one memory and the computer program code configured to, with the at least one processor, cause the apparatus at least to perform:
receive at least one measured signal characteristic from a user equipment, the user equipment being located at a user equipment location, wherein the at least one signal characteristic is filtered;
compare the at least one measured signal characteristic to at least one of a plurality of signal characteristics, each signal characteristic from the plurality of signal characteristics being associated with a respective measurement point;
determine, based on the comparing, a probability that the user equipment location is a first location;
receive a sequence of signal characteristic measurements as part of a measurement report (MR)/call/transaction detail report (XDR), the sequence of signal characteristic measurements comprising at least a first measurement at a first timestamp and a second measurement at a second timestamp, wherein the first measurement and the second measurement comprise reference signal receiver power (RSRP) values, wherein the MR comprises a list of one or more RSRP values, and the XDR comprises one or more serving cell RSRP values; and determine a location of the user equipment by comparing at least one user equipment MR/XDR measurement from an unknown location to at least one fingerprint RSRP measurement.

9. An apparatus as claimed in claim 8, wherein the user equipment location is a location of a user equipment within a venue.

10. An apparatus as claimed in claim 9 further configured to conceptually partition the venue into a plurality of sections.

11. An apparatus as claimed in claim 10, wherein each section of the plurality of sections comprises one or more measurement points.

12. An apparatus as claimed in claim 8 further configured to store the plurality of signal characteristics and the respective measurement point associated with a respective signal characteristic in a database.

13. An apparatus as claimed in claim 8 wherein a distribution of measurement points is dependent on a layout of the venue.

14. An apparatus as claimed in claim 8, further configured to input the sequence of signal characteristic measurements into a Hidden Markov Model.

15. An apparatus as claimed in claim 8 further configured to output at least one of:
the determined location of the user equipment; and
the determined route taken by the user equipment.

16. A non-transitory computer readable storage medium comprising computer readable instructions which, when performed by at least one processor, cause an apparatus to:
receive at least one measured signal characteristic from a user equipment, the user equipment being located at a user equipment location, wherein the at least one signal characteristic is filtered;
compare the at least one measured signal characteristic to at least one of a plurality of signal characteristics, each signal characteristic from the plurality of signal characteristics being associated with a respective measurement point;
determine, based on the comparing, a probability that the user equipment location is a first location; and
receive a sequence of signal characteristic measurements as part of a measurement report (MR)/call/transaction detail report (XDR), the sequence of signal characteristic measurements comprising at least a first measurement at a first timestamp and a second measurement at a second timestamp, wherein the first measurement and the second measurement comprise reference signal receiver power (RSRP) values, wherein the MR comprises a list of one or more RSRP values, and the XDR comprises one or more serving cell RSRP values; and
determining a location of the user equipment by comparing at least one user equipment MR/XDR measurement from an unknown location to at least one fingerprint RSRP measurement.

* * * * *